Jan. 1, 1924

J. HIPPE

TRAILER

Filed April 10, 1922

John Hippe.
INVENTOR

Patented Jan. 1, 1924.

1,479,237

UNITED STATES PATENT OFFICE.

JOHN HIPPE, OF DESLACS, NORTH DAKOTA.

TRAILER.

Application filed April 10, 1922. Serial No. 551,107.

*To all whom it may concern:*

Be it known that I, JOHN HIPPE, a citizen of the United States, residing at Deslacs, in the county of Ward and State of North Dakota, have invented new and useful Improvements in Trailers, of which the following is a specification.

This invention relates to improvements in automobile trailers.

An object of the present invention is the provision of means whereby the wheels of a trailer will be automatically steered so as to track the front wheels of a towing car, both when travelling straight ahead and when turning.

Another object of the invention is the provision of an automatically operated steering apparatus for the purpose above stated, which is simple of construction, positive in operation and which may be easily and quickly attached to a car.

With the above and other objects in view, the invention further includes the following novel features and details of construction, to be hereinafter more fully described, illustrated in the accompanying drawings and pointed out in the appended claims.

In the drawings:—

Figure 1:
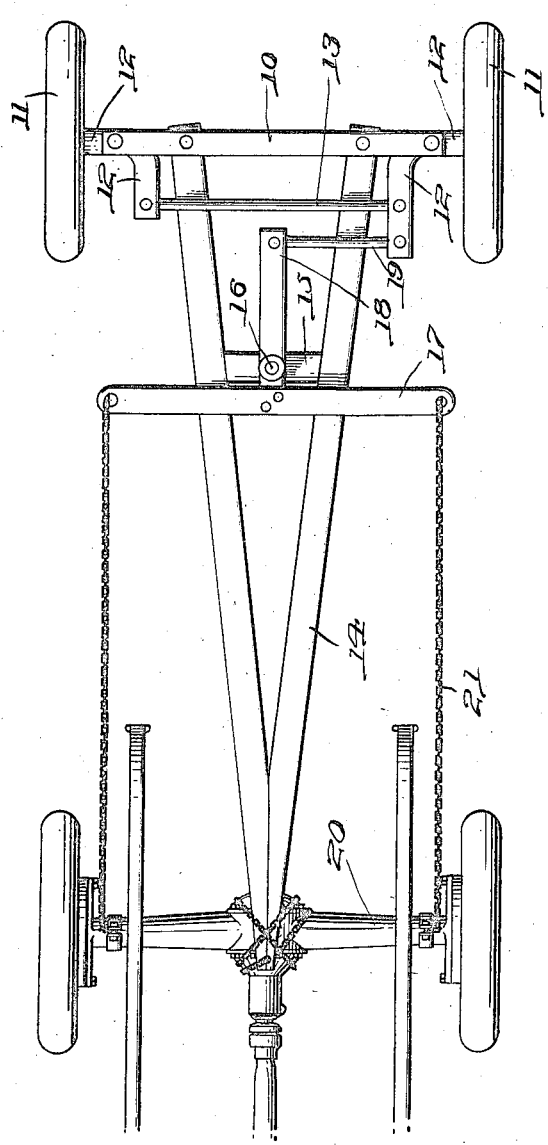
Figure 1 is a plan view showing the rear portion of an automobile running gear with the invention attached.
Figure 2:
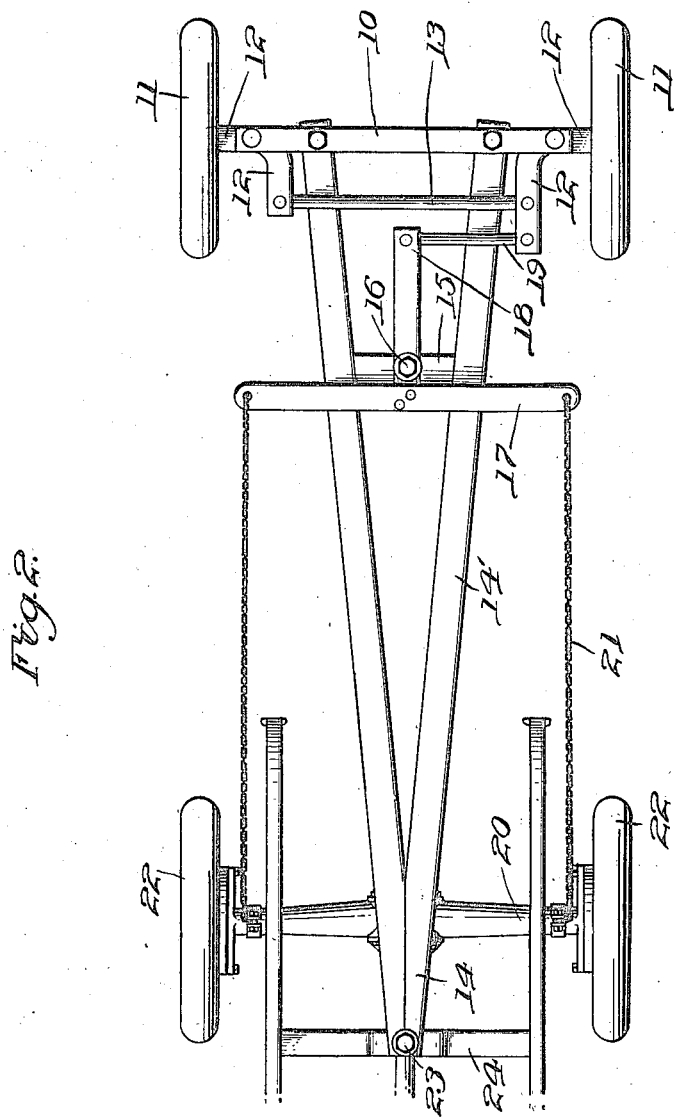
Figure 2 is a similar view illustrating the manner of attaching the invention to a truck or other vehicle capable of carrying a heavy load.

Referring to the drawings in detail, wherein like characters of reference denote corresponding parts, both in Figures 1 and 2, the reference character 10 indicates the axle of a trailer body, which may be of the two wheel type. The wheels which are indicated at 11 are secured to the axle 10 through the medium of steering knuckles 12, both of which are connected by a rod 13 so as to provide for the simultaneous movement of the knuckles.

Extending forwardly from the axle 10 is a tongue 14, the latter being preferably V-shaped in plan and provided with a transversely arranged connecting bar 15. Secured to this bar by means of a pivot pin or bolt 16 is a T-shaped member which includes a transversely arranged bar 17 and a longitudinally arranged bar 18, the said bars being rigidly connected together or of integral construction. The inner end of the longitudinally arranged bar 18 is connected to one of the steering knuckles 12 by means of a rod 19.

The transverse bar 17 extends preferably beyond the side edges of the tongue 14 and each end of this bar is connected to the opposite side ends of the rear axle housing 20 of an automobile by means of a chain or other flexible connection 21, while the tongue 14 is connected to the differential housing on a line with the longitudinal center of the automobile.

From the foregoing description and the accompanying drawings, it will be seen that the wheels 11 will track the front wheels of the towing car when travelling straight ahead and when making a turn, or backing the chains 21 will move the T-shaped member upon the pivot 16 so as to keep the transverse bar 17 substantially parallel with the rear axle of the towing car. This will, through the medium of the connecting rod 19 operate the steering knuckles 12 so as to steer the trailer in a course taken by the said towing car.

In Figure 2 of the drawings, the construction is identical with that just described except, that the tongue 14' is of greater length and its forward end is pivotally connected as shown at 23 intermediate the ends of a bar 24 secured transversely beneath the frame 25.

The invention is susceptible of various changes in its form, proportions and minor details of construction and the right is herein reserved to make such changes as properly fall within the scope of the appended claims.

Having described the invention what is claimed is:—

1. In a trailer, a tongue for connecting the trailer to a towing vehicle, knuckles pivotally connecting the wheels of the trailer to the trailer axle, a rod connecting the knuckles, a T-shaped operating member including a transverse bar and a longitudinally disposed bar, means for pivotally securing the longitudinal bar to the tongue, a rod connecting the longitudinal bar and one of the knuckles and means connecting the outer ends of the transverse bar with the towing vehicle upon opposite sides of the tongue.

2. In a trailer, an axle, supporting wheels, steering knuckles operatively connecting the wheels and axle, a tongue extending from the axle for connection to a vehicle, an arm disposed longitudinally of and pivotally mounted upon the tongue, an arm secured to and disposed at right angles to the pivotally mounted arm, flexible connections between the outer ends of the right angularly disposed arm and the vehicle, a rod having one end pivotally connected to the longitudinally disposed arm and its opposite end pivotally connected to one of the steering knuckles and means connecting the steering knuckles to provide for simultaneous movement.

In testimony whereof I affix my signature.

JOHN HIPPE.